June 16, 1931. W. W. LASKER 1,810,317
CLUTCH MECHANISM FOR CARD PUNCHES
Filed April 13, 1927    2 Sheets-Sheet 1

Inventor
William W. Lasker
By his Attorney
W. A. Sparks

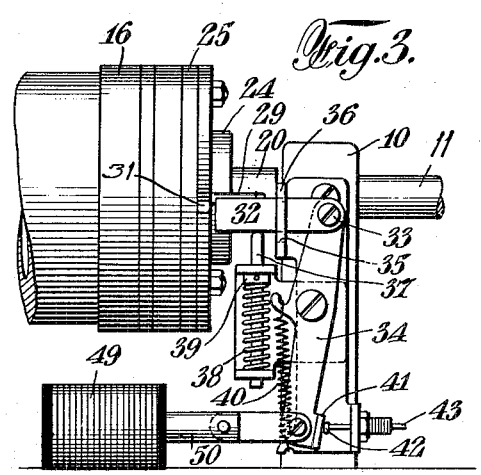
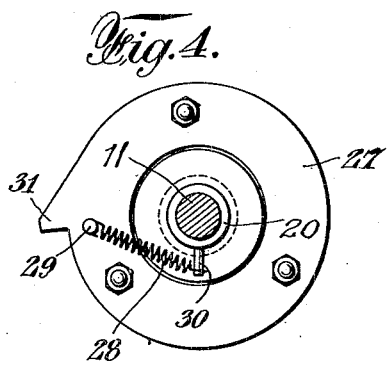
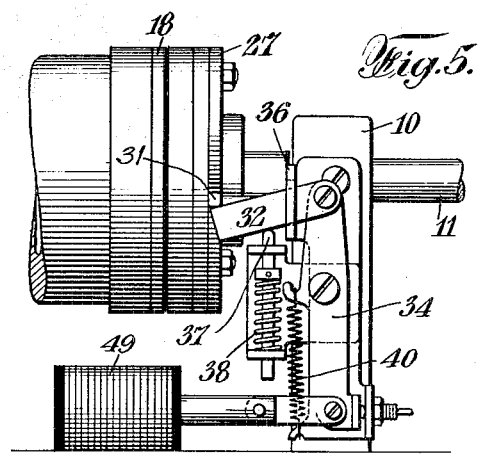
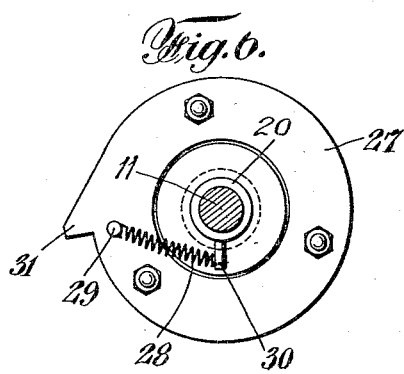
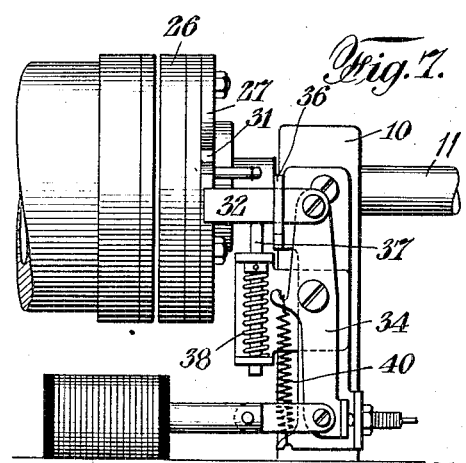
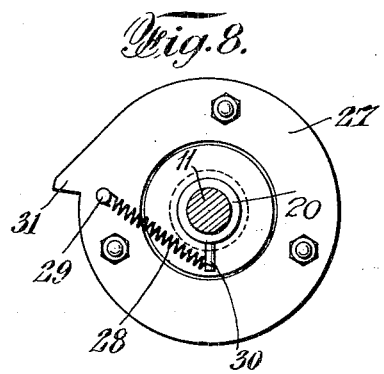
Inventor
William W. Lasker
By his Attorney Patented June 16, 1931

1,810,317

UNITED STATES PATENT OFFICE

WILLIAM W. LASKER, OF BROOKLYN, NEW YORK, ASSIGNOR, BY MESNE ASSIGNMENTS, TO REMINGTON RAND INC., OF NEW YORK, N. Y., A CORPORATION OF DELAWARE

CLUTCH MECHANISM FOR CARD PUNCHES

Application filed April 13, 1927. Serial No. 183,388.

This invention relates generally to clutch mechanisms, and in particular to clutch mechanisms for card punching machines and similar devices wherein it is necessary to have a clutch which will give a single rotation and stop the shaft at precisely the same point at each operation, and the principal object is to produce a simple, efficient and dependable clutch for this type of machine.

Another object is to produce a friction clutch in which a very strong gripping effect may be produced instantaneously, and in which a positive and complete release may be effected instantaneously so as to obviate any drag.

Another object is to produce a clutch which may be rendered effective by the exertion of very little power either manually thru a key or thru a key-controlled solenoid.

Another object is to provide the clutch with a retard cushioning and rebound mechanism whereby the clutch is positively disengaged.

Other objects will be apparent from the following description and the appended claims.

I attain all of these objects by mechanism illustrated in the accompanying drawings, in which:

Fig. 3 is a fragmentary elevational view showing the mechanism at the instant of rendering the clutch effective.

Fig. 4 is a side view of the clutch-controlling plate as viewed toward the left in Figures 1, 2, 3, 5 and 7 at the instant shown in Fig. 3.

Fig. 5 is a view similar to Fig. 3 but showing the mechanism at the instant that the abutment member is fully depressed and the clutch at the instant of release.

Fig. 6 is a view similar to Fig. 4 but taken at the same instant as Fig. 5.

Fig. 7 is a view similar to Figs. 3 and 5 but showing the mechanism at the instant that the clutch-controlling plate has been thrown back to its greatest extent.

Fig. 8 is a view similar to Figs. 4 and 6 but taken at the same instant as Fig. 7.

Like characters of reference refer to like parts throughout the several views.

Figure 1:
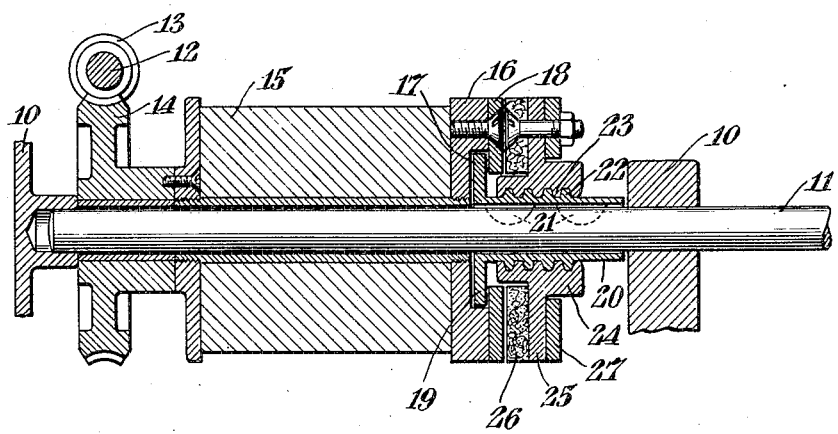
Fig. 1 is a vertical sectional view taken along the line of the shaft on which the clutch mechanism is mounted.

Referring now to the drawings in detail, 10 represents the framework of the machine which may be of any suitable character to support the various parts, and mounted in bearings in said frame or otherwise supported thereby is a shaft 11 which is to be intermittently driven by a constantly running operating mechanism when clutched thereto.

A shaft 12 is constantly driven by an electric motor (not shown) or other means and carries a worm 13 which drives a worm wheel 14. The worm wheel 14 is secured to a body 15 which in card perforating or punching machines is utilized for purposes which it is unnecessary to consider here, and the whole is rotatable on the shaft 11.

Secured to the body 15 in any suitable manner is a disk 16 which is formed with a counter-sink 17 in its outer face. A washer or centrally perforated plate 18 is fastened to disk 16 by screws or other securing elements and partially overlies the countersink 17 so as to confine a head 19 in said countersink, the head 19 being less in thickness than the depth of said countersink.

It will be seen that all of the parts 14, 15, 16 and 18 move as a single piece, and that they are normally (Fig. 1) free to rotate on shaft 11 without effecting rotation of said shaft 11. However, the head 19 is formed on the end of a member 20 which is keyed to the shaft 11 as at 21 and is capable of a small amount of movement longitudinally on said shaft. The member 20 which is really a sleeve, is provided with an external thread 22 which meshes with an internal thread 23 formed in a member 24. Member 24 is formed with a flange 25 to one side of which is secured a clutch facing 26 of fibre or other suitable material.

Secured to the other side of flange 25 is a stop disk or ring 27. A spring 28 is anchored at one end to a pin 29 on disk 27 and at the other end to a pin 30 extending from the sleeve 20, and tends constantly to rotate the stop member 27 counter-clockwise in Figs. 4, 6 and 8. The stop member 27 is formed with a stop nose 31.

Figure 2:
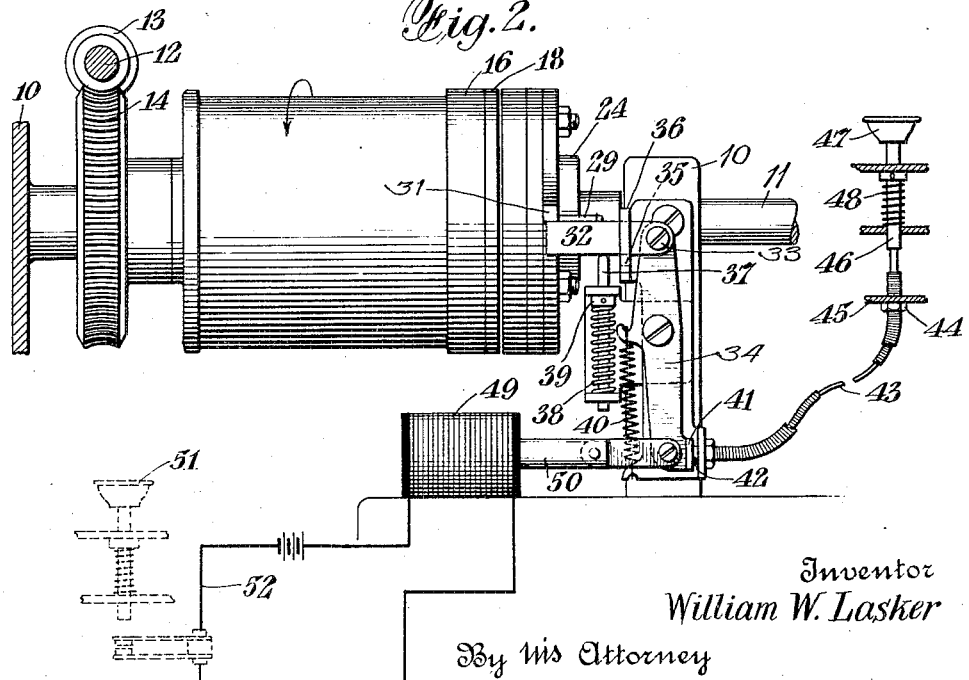
Fig. 2 is a front elevation of the clutch mechanism and the operating and controlling means therefor.

It will now be seen that if the stop nose 31 is not intercepted, the spring 28 will effect counter-clockwise rotation of the disk 27 thereby turning member 24 which, through its threaded connection at 23—22 will cause the member 24 to move to the left in Figs. 1 and 2 until clutch face 26 grips the disk or ring 18 whereupon shaft 11 will be clutched to members 18, 16, 15, and 14 and caused to rotate by power from the motor shaft 12.

Normally, however, the nose 31 is restrained against movement under the influence of spring 28 by means of an abutment member 32, as best seen in Figs. 2 and 3. This abutment member is in the form of a bar pivoted at 33 to the upper arm of a rock lever 34, and is guided in a slot 35 formed in a bracket 36 secured to the main frame 10. The free end of abutment member 32 is normally supported by a plunger 37 mounted in ears of bracket 36 and pressed upwardly by a spring 38, movement of plunger 37 being limited by a collar 39 on the plunger.

The rock lever 34 is normally held in the position shown in Fig. 2 by a spring 40 which presses the toe 41 of said lever against the enlarged end 42 of a Bowden wire 43. This wire 43 is led to any desired place as for instance the keyboard of a card perforating machine, and passes thru a nipple 44 secured to a stationary part 45, the casing of the wire being secured to said nipple as is customary. After passing through the nipple 44 the wire contacts with the bottom of a key stem 46 having a button 47 and a key spring 48.

By depressing key 47, the wire 43 is extruded from the inner end of its casing, and the enlargement 42 presses toe 41 over until the abutment piece 32 is withdrawn from under nose 31 as shown in Fig. 3. Thereupon spring 28 turns the member 27 effecting clutching action as hereinbefore described. If the key 47 is held depressed, any desired number of operations of shaft 11 may be effected. However, as soon as key 47 is released the train of mechanism to the abutment piece 32 returns to the position shown in Fig. 2, so that piece 32 is again in the path of nose 31. As nose 31 reaches abutment 32, it has gathered considerable momentum, and to avoid shock the spring 38 is provided. The nose 31 presses down on abutment 32 carrying down the piece 32 and the plunger 37 compressing spring 38. As the abutment piece 32 reaches the bottom of slot 35, it is completely stopped thereby as shown in Figs. 5 and 6, and the member 24 is arrested, thereby causing relative movement of the threaded engaging elements 22 and 23 whereby the clutch is released. The spring 38 now presses the plunger 37 up with some force throwing the abutment piece and member 27 back some little distance as shown in Figs. 7 and 8, so that any drag is prevented and the shaft 11 positively stops at the same point at every operation of the clutch.

In the drawings, there has also been shown an electrical device for operating the clutch, such device comprising a solenoid 49, the core 50 of which is pivotally connected to the lower arm of lever 34. By depressing a key indicated at 51 in Fig. 2, the circuit indicated at 52 is closed and the solenoid 49 is energized, thereby drawing the core 50 to the left in Fig. 2 and rocking lever 34 with the same results as above described in connection with key 47. Either or both means may be used in the machine.

It is of course to be remembered that shaft 11 is connected to mechanism to be operated which mechanism so loads the shaft that the spring 28 is not strong enough to effect retrograde movement of the shaft, and also prevents movement of the shaft by reason of members 14 to 18 having their bearing thereon.

Applicant's clutch works by friction and the friction occurs at three places, namely, between the fiber ring 26 and the metal ring 18, between the metal ring 18 and the head 19 and between the screw threads of the nut 24 and the sleeve 20. The ring 26 may be of a material giving a higher co-efficient of friction than the metal surfaces, but in addition to that fact the ring is of greater diameter than the head 19; and said head 19 is, itself, of greater diameter than the screw threads. The friction between the rings 18 and 26, therefore, acts with a leverage advantage over that between the ring 18 and the head 19, and this in turn acts at a leverage advantage over the friction in the screw threads. Moreover, the screw threads may be lubricated.

When the arm 32 is withdrawn from the shoulder 31 the spring 28 turns the ring 27 in a direction to screw said ring and its facing 26 against the ring 18 which thus becomes bound or clamped between the ring 26 and the head 19; the friction thus generated may be insufficient to drive the shaft and there will be a slight slipping. As, however, the ring 26 has a mechanical advantage over the head 19, as has been explained, it will be the head 19 that will slip thus further tightening the clutch until it has become tight enough to transmit the power.

When the ring 27 is arrested as shown in Figs. 5 and 6, this element being positively stopped, ring 18 will be forced to slip on ring 26 carrying head 19 with it. This it can easily do because when considering friction, head 19 has a mechanical advantage over the screw threads and also the pitch of said threads is such that the continued motion of head 19 loosens the screw. For both these reasons head 19 can continue its motion with certainty and ease. A slight motion of head 19, after the arrest of ring 26, loosens the screw sufficiently to relieve the friction. As soon as this occurs spring 38 and arm 32 give a slight reversed motion to ring 25, thus still further loosening the screw and leave the clutch entirely free.

It will be understood that the difference between the clutch running quite free when in its disconnected position and the clutch being clamped tight in running position, is a difference of only a few thousandths of an inch lengthwise of the shaft so that the distance that the device 24 is screwed lengthwise of the shaft is slight.

It will be perceived that the ring 18 is the essential part of the driving element.

While I have described what I consider to be the most desirable embodiment of my invention, it is evident that various changes may be made in the mechanism without departing from the spirit of my invention, and I therefore do not limit myself to the exact embodiment herein shown nor to anything less than the whole of my invention as hereinafter claimed.

What I claim is:

1. In a clutch mechanism, the combination of a driving ring, a driven shaft, a clutch element mounted on said shaft for rotating said shaft and slidable axially on said shaft, a flange on said element for engagement with one face of said ring, a second clutch element concentric with said first clutch element and connected thereto by a quick acting thread, a flange on said second clutch element, and a clutch face ring mounted on the flange of said second clutch element for engagement with the other face of said driving ring thereby producing a greater friction between the second clutch element and the driving ring than that produced between the first clutch element and driving ring to increase the gripping action between the clutch elements and driving ring.

2. The combination of a driving element, a driven element adapted to be clamped to the driving element by two friction devices on the driven element, said friction devices connected by a screw, and the first said friction device having a mechanical advantage over the second said friction device and the screw disposed so that any motion given to the first said friction element relative to the second said friction element tends to tighten the screw; and means for arresting the first said friction element to release the clutch.

3. The combination with a driving element of a driven element having two parts adapted for frictional engagement with the driving element, said two parts connected by a screw and the first said part having a mechanical advantage over the second said part, the pitch of the screw being such that any motion of the first said part relative to the second said part in the direction of drive tends to tighten the screw; means for arresting the first said driven part to release the clutch; and a spring connecting the said two friction parts and tending to tighten the screw to start the clutch into action.

4. The combination with a driving element of a driven element, comprising two frictional parts connected by a screw and the first of said parts having a mechanical advantage over the second of said parts, and the pitch of the screw being such that motion of said first part in the direction of drive relative to the second part tightens the screw; a device movable into position to arrest the first said part; a spring strained by the force of arrest, said spring after the loosening of the screw re-acting to turn said first part in reversed direction and thus further to loosen the screw; and another spring connecting said first part with said second part and acting to tighten the screw initially to close the clutch.

In testimony whereof I affix my signature.

WILLIAM W. LASKER.